Patented Aug. 26, 1924.

1,506,033

UNITED STATES PATENT OFFICE.

CHARLES B. TRESCOTT, OF CHICAGO, ILLINOIS.

PROCESS OF PRODUCING MEALY COOKED POTATOES.

No Drawing.     Application filed April 14, 1923.   Serial No. 632,138.

*To all whom it may concern:*

Be it known that I, CHARLES B. TRESCOTT, a citizen of the United States, residing at Chicago, in the county of Cook and State of Illinois, have invented a new and useful Improvement in Processes of Producing Mealy Cooked Potatoes, of which the following is a specification.

My invention relates to a process of producing cooked potatoes in the condition known as "mealy". Potatoes are ordinarily cooked by boiling in water or, as more usually in large quantities in restaurant or hotel kitchens, by steam or vapor. Such cooked potatoes are, for the most part at least, soggy or waxy because of their large moisture content, in which condition they are comparatively tasteless; whereas to have the desirable potato-flavor they should be mealy.

It is the object of my invention to provide the cooked potatoes in mealy condition, and this I accomplish by extracting, while they are still hot and preferably while in the container in which they are cooked and immediately after shutting off the heat, sufficient of their contained moisture to adequately dry and thereby render them desirably mealy.

The potatoes to be treated by my improved process are first boiled, preferably after being peeled, and while still hot, and by preference without removing them from the container, which should then be or be rendered practically air-tight, I exhaust therefrom and from the potatoes the moisture until the potatoes are dry to an extent to render them mealy. Exhaustion of the moisture may best be accomplished by applying an exhaust-pump to the container and operating the pump for the purpose until the desired degree of dryness has been attained.

It is practicable, but not so desirable, to perform the cooking in an open boiler and transfer the hot potatoes to an air-tight receptacle from which to exhaust their contained moisture, in the manner described, to any desired degree of dryness according to the length of time the pump is operated to apply the resultant vacuum, which withdraws the moisture from the center of the potatoes, where they are hottest and therefore generate the most vapor, as well as from their other portions.

In the mealy condition thus produced, the potatoes are not only the more palatable because of their rich flavor, but they are particularly desirable for hashing with meat, as in corned-beef hash, especially when the hash is marketed in sealed cans, since they keep in better condition because of being deprived of water. Moreover, so called "French-fried" potatoes from my mealy product are peculiarly delicious, by becoming expanded in frying and thereby light with fluffy interior.

When potatoes prepared by my process are to be baked, they should be cooked in their jackets, as usual, but with their ends cut off to facilitate extraction, by the described procedure, of their contained moisture; and such baked potatoes are also greatly improved in taste because of having the rich flavor hereinbefore referred to.

I claim:

1. The process of rendering boiled potatoes mealy, which consists in subjecting them, while in whole and hot condition and under close confinement, to exhaustion of their contained moisture to the desired mealy-rendering degree of dryness.

2. The process of producing cooked potatoes in mealy condition, which consists in pealing and boiling the peeled potatoes and then subjecting them, while in whole and hot condition and under close confinement, to exhaustion of their contained moisture to the desired mealy-rendering degree of dryness.

3. The process of producing cooked potatoes in mealy condition, which consists in boiling them and then subjecting the whole potatoes, in the receptacle in which they were boiled and while still hot, to exhaustion of their contained moisture to the desired mealy-rendering condition of dryness.

CHARLES B. TRESCOTT.